United States Patent Office.

LEVI S. FALES, OF TARRYTOWN, NEW YORK.

Letters Patent No. 71,725, dated December 3, 1867.

IMPROVED FERTILIZER.

*The Schedule referred to in these Letters Patent and making part of the same.*

TO ALL WHOM IT MAY CONCERN:

Be it known that I, LEVI S. FALES, of Tarrytown, in the county of Westchester, and State of New York, have invented a new and improved Fertilizer; and I do hereby declare that the following is a full, clear, and exact description of the same.

The object of this invention is to provide a concentrated manure which will exert a more beneficial and stimulating action upon the growth of plants and vegetables than the so-called poudrette and other similar artificial fertilizers hitherto in use.

The invention consists in the combination of night-soil, charcoal, sulphate of ammonia, bones, dried blood, and saltpetre, in such proportions as to secure an inodorous compound, which is not only highly nitrogenous in its nature, but which also contains a due proportion of the most desirable soil-enriching mineral constituents.

To enable others to understand the nature of my invention, I will proceed to describe its composition and mode of manufacture.

In making my fertilizer, I take any desired quantity of night-soil and add thereto sufficient "waste acid" from petroleum-refineries to neutralize whatever free ammonia may exist therein, after which, to each ton of night-soil is added a quantity, say, about two (2) barrels of charcoal, preferably that made from peat, sufficient to absorb other odorous gases, such, for instance, as sulphuretted hydrogen. With this mixture is mingled a quantity equal to ten per cent. of its weight of sulphate of ammonia, formed preferably from the waste ammoniacal water of gas-works and the waste acid of petroleum-refineries; also two hundred and fifty (250) pounds of pulverized bones, one hundred (100) pounds of dried blood, and fifty (50) pounds of saltpetre; the whole mass being thoroughly mixed or commingled by any suitable means, and afterwards dried in shallow pans until reduced to a dry and pulverulent condition.

The ammonia and other mal-odorous gases being either absorbed or neutralized, as hereinbefore set forth, the fertilizer is rendered quite inodorous, while the highly-azotized nature, not only of the organic matter contained therein, but of the sulphate of ammonia and saltpetre, renders the compound very rich in nitrogen, the requisite proportion of the most desirable mineral or inorganic fertilizing constituents being furnished for the most part by the pulverized bones and the elements of the sulphate of ammonia and saltpetre.

I do not propose to limit myself to the precise specified proportions of the several materials set forth, as the said proportions may, when desired, be changed to some extent.

What I claim as my invention, and desire to secure by Letters Patent, is—

The fertilizer, formed by the combination of the several specified materials, substantially as herein set forth.

LEVI S. FALES.

Witnesses:
A. LE CLERC,
CHARLES H. ASHTON.